UNITED STATES PATENT OFFICE.

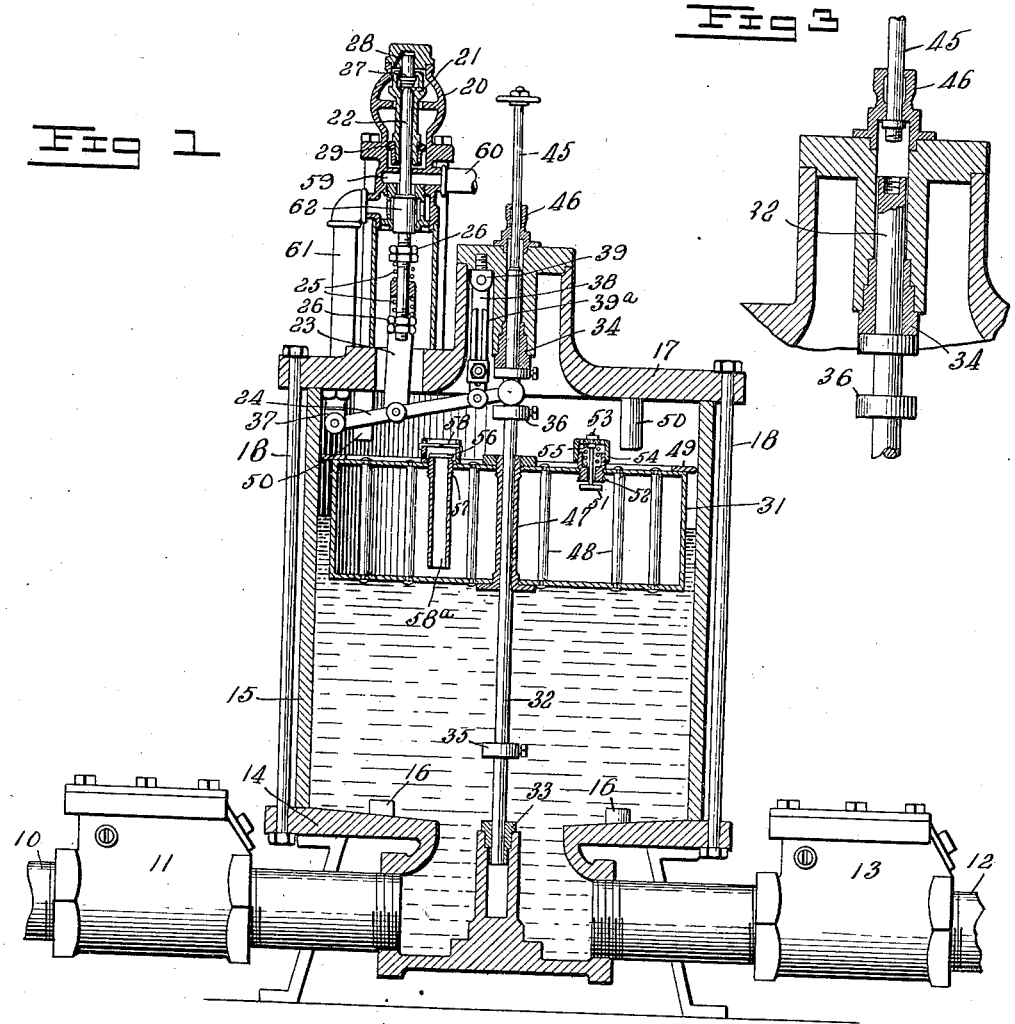

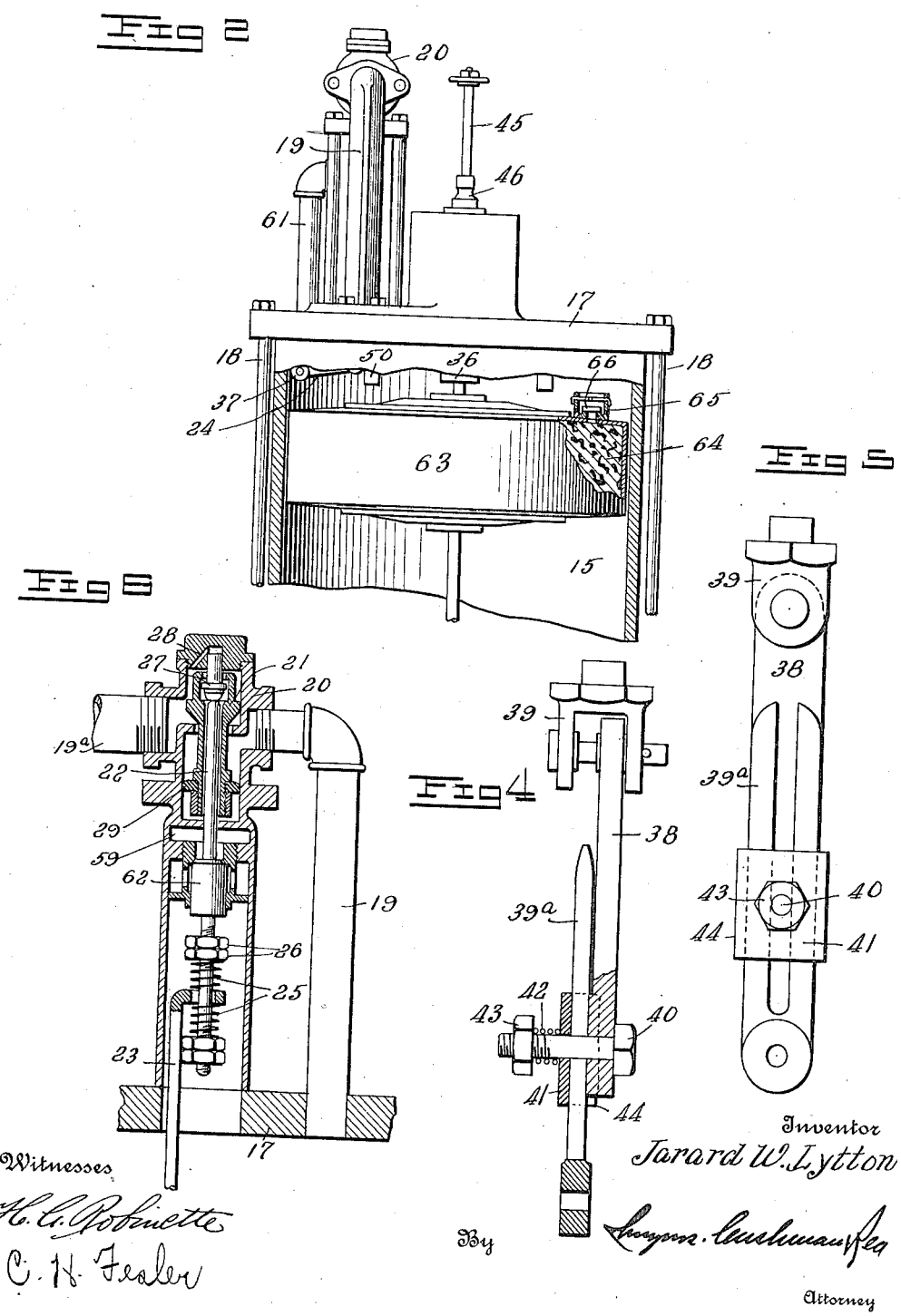

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

TRAP.

1,090,927.  Specification of Letters Patent.  Patented Mar. 24, 1914.

Application filed June 27, 1913. Serial No. 776,198.

*To all whom it may concern:*

Be it known that I, JARARD W. LYTTON, a citizen of the United States, residing at Franklin, in the county of Southampton and State of Virginia, have invented new and useful Improvements in Traps, of which the following is a specification.

The present invention relates to traps and feeders of that type in which water from any source may be trapped and transferred to any other point of delivery automatically and periodically, the construction which I have devised and which I shall describe in detail hereinafter being equally useful as a steam return trap in return systems; a pressure trap or pump for lifting water or other liquid; and a vacuum trap for operating in connection with a vacuum system. In fact, I contemplate the use of this trap or feeder wherever pressure or pressure and vacuum are utilized to transfer automatically and periodically water or other liquids.

In the drawings herewith I have shown one embodiment of my invention, and that the best now known to me, although it will be understood that I do not restrict myself to the details shown, as they may be varied within the range of mechanical skill without departing from the invention.

In the said drawings Figure 1 is a vertical sectional view of a trap made in accordance with my invention. Fig. 2 is a view partly in section to show a slightly modified form of float. Fig. 3 is a detail sectional view of the extension for the tappet-rod. Figs. 4 and 5 are detail views of an improved friction lock for the valve, which will be described in detail hereinafter. Fig. 6 is a detail sectional view on an enlarged scale of the pressure-valve bonnet and its contained parts.

Referring to the drawings by numerals, like numbers indicating like parts in the several views, 10 denotes an inlet pipe having therein any suitable non-return check valve conventionally shown at 11. 12 is an outlet pipe having a similar non-return check valve therein indicated at 13. The said inlet and outlet pipes connect through the bottom plate 14 of a casing 15, which forms the float chamber of the trap, the bottom 14 being preferably sloped toward the center so as to insure proper drainage, and prevent accumulation of sediment in the bottom of the casing 15, and furthermore suitable stops 16 are preferably formed to receive the impact of the float when it descends to its lowermost position. The casing 15 has a head plate 17 which closes its upper end, tie rods 18 being preferably used, as shown, to clamp the bottom plate, the head plate, and the casing together. An inlet pipe 19 is provided in the casing to admit pressure, either of steam or air pressure, from the bonnet 20 to said casing, said bonnet 20 being coupled by suitable connection 19ª, with such pressure source. The pressure is controlled by means of a suitable valve 21 mounted in said bonnet, and in order to actuate said valve regularly I provide valve actuating means comprising rod 22 which is connected at its lower end by an interposed link 23 with an actuating lever 24, this link connection preferably, as shown, being a yielding or spring connection with the fork of the link 23 engaging the springs 25 above and below the fork, the tension of which springs is adjustable by means of the tensioning and lock nuts 26. This is to give a connection which will yield sufficiently to overcome any tendency of the parts to hammer or pound under sudden movements of the lever 24 and the valve-operating rod 22. In order that the valve 21, which is normally held closed by pressure standing against it, may open readily and automatically I provide the preliminary valve 27 which is carried, preferably, by a cage at the top of the valve 21, and receives the thrust of the rod 22. This preliminary valve 27 being normally held to its seat by pressure through the small passage 28 leading through the cap nut to the top of the preliminary valve. Movement of the preliminary valve from its seat permits pressure to pass through the bore of the valve 21 to the chamber below the valve seat and beneath the piston 29, which, being of larger area than the valve 21, will, when pressure is equalized, open said valve and permit pressure from the bonnet 20 to pass by pipe 19 to the casing 15.

Within the casing 15 is arranged a float 31 which rises and falls on a tappet rod 32, the lower and upper ends of which tappet rod slide in suitable bearings 33 and 34 respectively, the range of travel of the float 31 being between adjustable tappet blocks 35, 36, so that as the float rises and falls it will, during its upward travel, strike the tappet block 36 and move the tappet rod 32 upward, and as it moves downwardly will strike the tappet block 35 and move the tappet rod 32 downwardly.

The lever 24 is connected with the tappet rod 32 near its upper end, said lever being pivoted to a suitable pivot post 37 at its other end, and it will be seen that the said lever 24 will, in response to movements of the float and tappet rod, be shifted, and through the mechanism heretofore described operate the inlet valve.

In order that the lever 24, valve operating rod 22 and the valve parts may be maintained in open position after the float has actuated them on its upward movement and admit expelling pressure to the trap until such float has reached the limit of its descent and the trap has been cleared of water, I provide the frictional locking device shown in detail in Figs. 4 and 5, which comprises a bar 38 pivotally hung from the post 39 in the hood of the head plate 17, as shown in Fig. 1, the said bar 38 being coupled to a forked bar 39ª by a frictional coupling comprising the bolt 40, clamping plate 41, and the tensioning spring 42, said tensioning spring being held by a nut 43 in any condition of compression. It will be seen that with this construction the bars 38 and 39 may slide or telescope relative to each other in parallel lines, the overhanging edges 44 of the clamping plate 41 preventing any twisting or displacement of the bars from their parallel condition, so that there is provided a link for the lever 24 which will shorten and lengthen as the lever is moved.

It is designed to have the spring 42 under sufficient compression to exert a friction between the parts which will support the weight of the lever 24 and its sustained associated parts when the lever is thrust upwardly to the position shown in Fig. 1, but the friction between the parts 38 and 39 will not be sufficient to prevent the float from forcing the lever to lowered position when it strikes the tappet block 35. This permits the float to descend as the trap is emptying without danger of the pressure valve, which is admitting pressure to the empty trap, closing before the trap has been completely cleared.

Preferably the hanger 29 will be made, as shown in Fig. 4, with a clearance space to receive the ends of the forked arm 39ª as it is thrust upward, and the outer ends of the arm 39ª are preferably tapered, as shown, in order that the parts may be readily assembled, for it will be clear that the tapered ends of the forked arm 39ª may be very readily forced under, and between the side flanges of, the friction block 41.

The tappet rod 32 at its upper end extends into the bonnet of the head plate 17, as shown in Fig. 1, and is connected with the upper end of this tappet rod by means of a detachable connection, as shown in Fig. 3, I preferably provide a hand rod 45 which extends outside of the trap through a suitable stuffing box 46. This hand rod 45 may be utilized to test and operate the tappet rod and valve mechanism if desired, and while it may be left coupled to the tappet rod and serve as an indicator to show whether or not the trap is working satisfactorily, if it is desired it may be uncoupled and drawn upwardly out of the way, as shown in Fig. 3.

The float 31, heretofore described as coupled to the tappet rod 32, has a sleeve 47 centrally thereof, and suitably secured to the top and bottom of the float by air tight joints to serve as a bearing for the tappet rod, and preferably reinforcing rods 48 will be provided to stiffen the float. At its upper surface I preferably provide the float with an annular ring 49 which serves the purpose of a buffer ring to take the impact of the float against the projections 50 on the head plate 17, which serves to limit the upward movement of the float and prevent too much thrust being imposed on the lever 24 and its associated parts. The said ring 49, as will be seen from Fig. 1, fits the casing 15 closely, although without frictionally binding thereon, and prevents any substantial amount of steam or other pressure passing around the float to the fluid which is being ejected.

In order that a highly buoyant float of relatively thin material may be used without danger of its being crushed under pressure, or distorted by expansion under vacuum, I provide means for equalizing pressure within the float, which means comprises the inlet valve 51 which seats against a valve seat formed in a threaded thimble 52, the stem 53 of the valve engaging a sliding cap 54 carried by the valve 52, a light spring 55 being provided to maintain the weight of the valve 51 and cap 54, and hold the said valve seated. Immediately the chamber 15 and the float 31 are subjected to pressure, the valve 51 will be opened and pressures equalized outside of and inside of the float, so that danger of crushing or distorting a float of very thin metal is obviated.

In order that no distortion may take place when the float is subjected to vacuum, I provide the valve 56 which is mounted in a thimble 57, a spider or wire 58 being provided to prevent displacement of the valve 56 from its thimble. The said valve 56 closes the upper end of a pipe 58ª which descends nearly to the bottom of the float 31. It will be seen that if the chamber 15 and float 31 be subjected to vacuum, the valve 56 will be opened and pressure will be equalized inside and outside of the float.

Furthermore, by dropping the pipe 58 nearly to the bottom of the float the said float will be cleared of any water from condensation or other source which may collect therein, vacuum exteriorly of the float or pressure interiorly thereof equally serving, respectively, to suck or force the water out through the pipe 58.

In order that atmospheric pressure may be restored in the trap 15, where the same is used as a return trap or a pump, or where the trap is used in a vacuum system, in order that the vacuum may be controlled, I provide a chamber 59 below the bonnet 20, which chamber leads by the pressure-outlet pipe 60 to the atmosphere, or, in a vacuum system to the vacuum source, said chamber 59 coupling by means of the pipe 61 with the interior of the casing 15, this passage being controlled by the valve member 62 mounted on the valve operating stem 22 heretofore described. The said valve member 62, as shown in Fig. 1, is closed when the valve 21 is opened, but on closing of the valve 21 the valve 61 moves to open position and permits communication from the casing 15 by pipe 61, chamber 59 and pipe 60 with the atmosphere or vacuum.

In Fig. 2 I have shown a float 63 of the same general character as that just described, except that the copper shell is filled with a light supporting material, such as cork 64, and since a filled float of this type will withstand pressure, it is only necessary to provide against distorting the float under high vacuum, for I have found that under high vacuum both the shell of the float and the cork have a tendency to expand and become disorted. To obviate this I provide the float with the vacuum valve which comprises a valve casing 65 carrying the disk valve 66, this disk being caged, as shown, so as to prevent its displacement from the casement. With this construction when vacuum exists in the trap the valve 66 is lifted from its seat, and the cork-filled interior of the float 63 is put under equal pressure with the pressure in the casing.

I claim:—

1. In a device of the class described, the combination with a casing having a fluid inlet, a fluid outlet, a valved pressure inlet, and a valved pressure outlet; of means in said casing to positively actuate said pressure outlet valve and to by-pass pressure around the pressure inlet valve, a float adapted to rise and fall with the fluid in the casing and move said valve actuating means only at the upper and lower limits of its travel, and a telescoping friction device to maintain said actuating means and the pressure valves in the position to which they have been moved by the float at either limit of its travel until it reaches its other limit of movement.

2. In a device of the class described, the combination with a casing having a fluid inlet, a fluid outlet, a valved pressure inlet, a valved pressure outlet; of a rising and falling float in said casing, means operated by said float only at the limit of its upward movement to positively close the pressure outlet valve and by-pass pressure around the pressure inlet valve at the limit of the downward movement of said float to change the relative positions of said valves, and a telescoping friction device connected with said valve operating means to maintain said valves in the positions to which they have been moved by the float at either limit of its travel until it reaches its opposite limit of movement.

3. In a device of the class described, the combination with a casing having a fluid inlet, a fluid outlet, a pressure inlet, and a pressure outlet; of a valve controlling said pressure inlet, a valve controlling said pressure outlet, a rising and falling float in said casing, means operated by said float at the extreme limits of its travel to positively actuate said pressure outlet valve and indirectly actuate the pressure inlet valve; and a two-part link frictionally connected to maintain said valves in the respective positions to which they have been moved while said float is rising or falling.

4. In a device of the class described, the combination with a casing having a fluid inlet, a fluid outlet, a pressure inlet, and a pressure outlet; of a valve controlling said pressure inlet, a valve controlling said pressure outlet, a preliminary valve movable with the pressure outlet valve for controlling a passage through the pressure inlet valve, a rising and falling float in said casing, means operated by said float at the extreme limits of its travel to positively actuate said pressure outlet, and preliminary valves, and indirectly actuate the pressure inlet valve, a two-part link with an adjustable friction connection between said parts to maintain said valves in the respective positions to which they have been moved while said float is rising and falling between its limits of travel, and means for varying the length of travel of said float.

5. In a device of the class described, the combination with a casing having a fluid inlet, a fluid outlet, and a pressure inlet; of a valve controlling said pressure inlet, a by-pass valve controlling pressure to actuate said pressure valve, a stem for opening said by-pass valve, a lever in said casing for moving said stem, a rising and falling float to actuate said lever only at the limits of travel of said float, and a two-part locking link frictionally connected together to maintain said by-pass valve in open or closed position, during the travel of the float between its limits of movement.

6. In a device of the class described, the combination with a casing having a fluid inlet, a fluid outlet, a valved pressure inlet, a valved pressure outlet, of a valve operating lever in said casing for positively actuating the pressure outlet valve and indirectly actuating the pressure inlet valve, a rising and falling float in said casing to actuate said lever only at the upper and lower limits of its travel, and a telescoping frictionally locked supporting link to maintain said lever in the position to which it has been moved by said float.

7. In a device of the class described, the combination with a casing having a fluid-inlet, a fluid-outlet, and a pressure-inlet; of a valve controlling said pressure-inlet, a valve controlling lever in said casing, a tappet rod with which said lever is connected, a rising and falling float moving freely on said tappet rod, adjustable stops on said rod to limit the travel of said float and move said rod sufficiently to operate said lever and open and close said valve, and a telescoping, frictionally-locked supporting link for said lever to maintain said lever and valve controlled thereby in the positions to which they had been moved by said float.

8. In a device of the class described, the combination with a casing having inlet and outlet passages, of a controlling valve for said casing, means for opening and closing said valve, and means for maintaining said valve in a predetermined position comprising a two-part telescoping link and a spring clamp for holding said link members temporarily in adjusted position.

9. In a device of the class described, the combination with a casing having inlet and outlet passages, of a controlling valve for said casing, means for opening and closing said valve, and means for maintaining said valve in a predetermined position comprising a suspended link member, a second forked link member sliding on said first-named member, and a spring clamp to hold said members temporarily in adjusted position.

In testimony whereof I have hereunto set my hand in presence of two subscribing witnesses.

JARARD W. LYTTON.

Witnesses:
C. C. VAUGHAN, Jr.,
D. M. WILLIS.

---

Copies of this patent may be obtained for five cents each, by addressing the "Commissioner of Patents, Washington, D. C."